F. JAMES.
PNEUMATIC FLEXIBLE SPIRAL CONVEYER.
APPLICATION FILED OCT. 11, 1920.
1,412,285.
Patented Apr. 11, 1922.
3 SHEETS—SHEET 2.
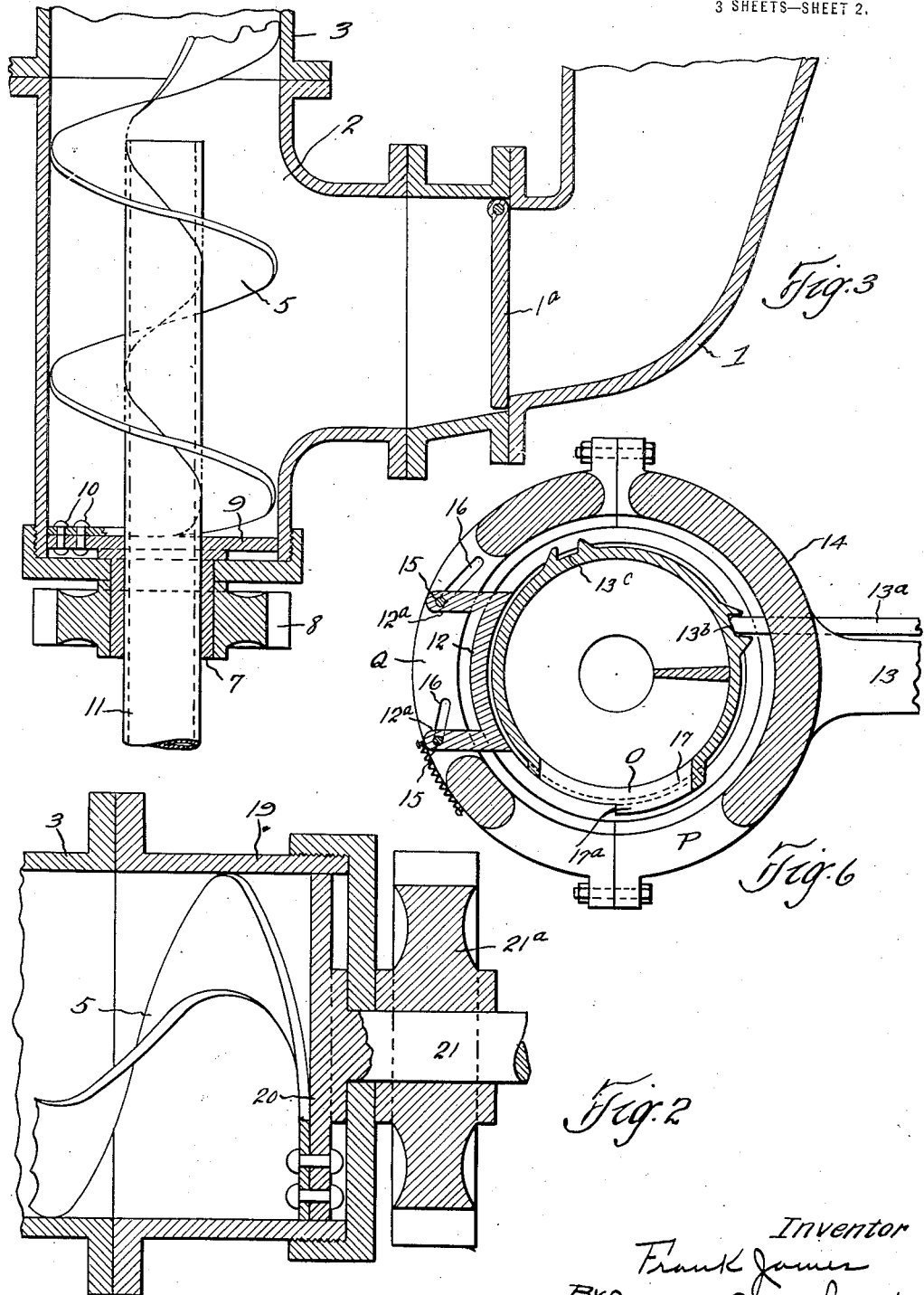

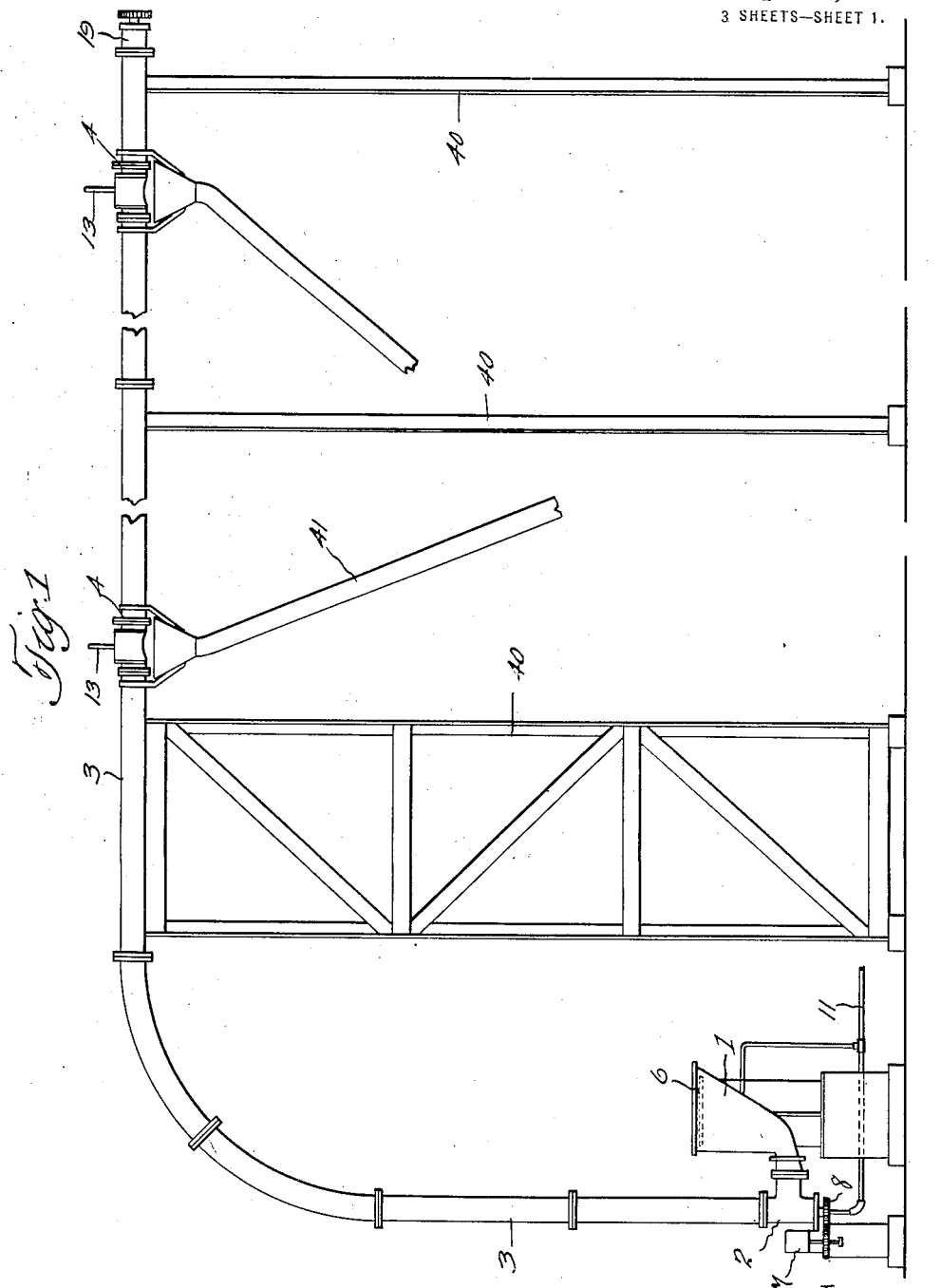

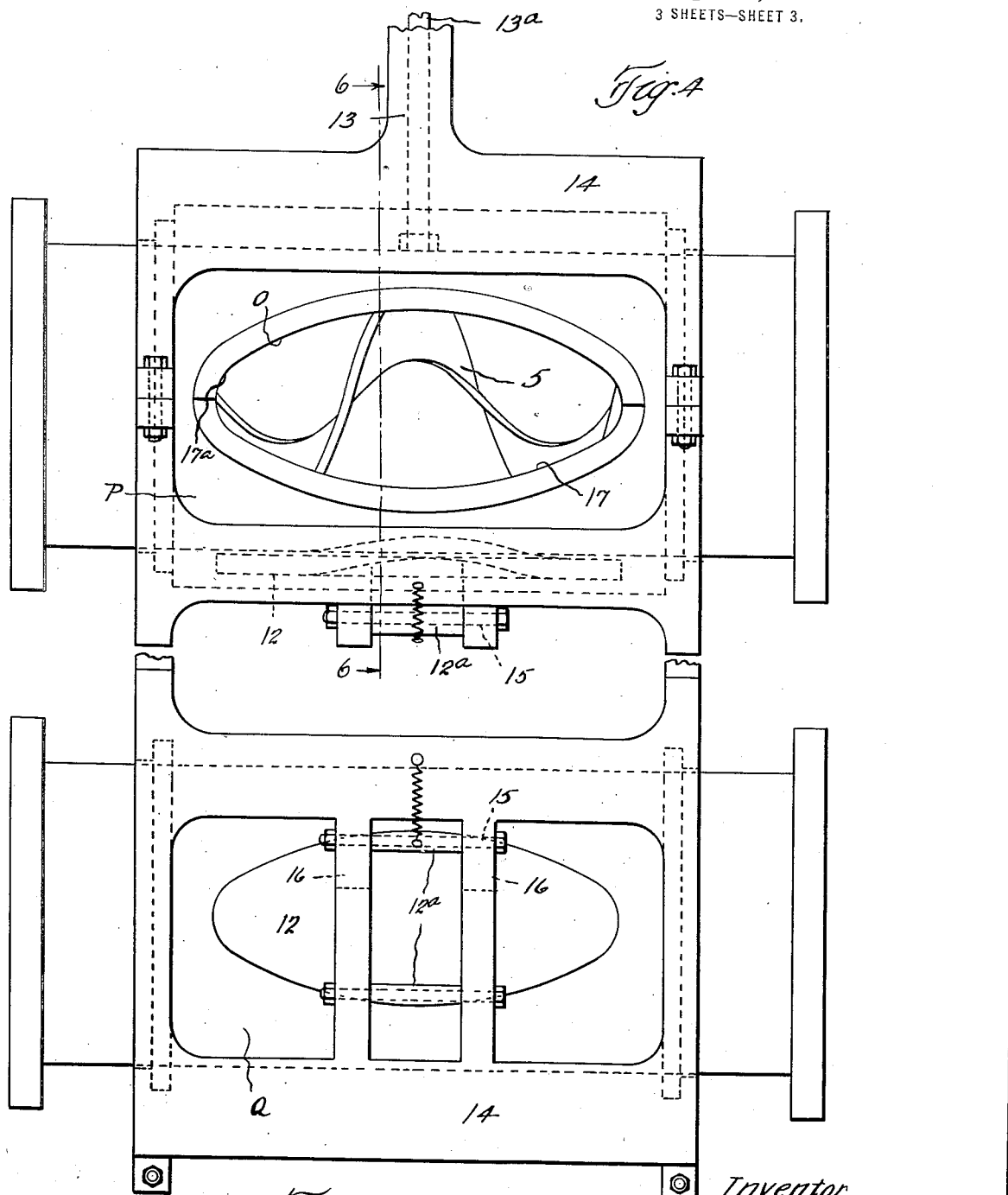

UNITED STATES PATENT OFFICE.

FRANK JAMES, OF CLEVELAND, OHIO.

PNEUMATIC FLEXIBLE SPIRAL CONVEYER.

1,412,285.  Specification of Letters Patent.  Patented Apr. 11, 1922.

Application filed October 11, 1920. Serial No. 416,111.

*To all whom it may concern:*

Be it known that I, FRANK JAMES, a citizen of the United States, residing at Cleveland, in the county of Cuyahoga and State of Ohio, have invented certain new and useful Improvements in Pneumatic Flexible Spiral Conveyers, of which the following is a specification.

This invention relates to conveyers and is particularly adapted for conveying wet concrete, sand, stone, small coal and other semi-fluid material. It can be used in building operations and also for general conveying purposes.

The conveyer is of a combined screw or spiral and pneumatic type, utilizing a pipe into which the material is introduced at one end, together with a blast of air or the like, said pipe containing a flexible spiral conveyer which permits the pipe to be extended by means of bends or the like in various directions, for the purpose of discharging the material at the desired place. Several points of discharge may be provided, each controlled by a suitable outlet valve as hereinafter explained.

In the accompanying drawings Fig. 1 is a side elevation of the conveyer system. Fig. 2 is a section of the parts at the far or outlet end of the pipe. Fig. 3 is a section of the parts at the inlet end. Fig. 4 is an enlarged detail in bottom view of one of the outlet valves. Fig. 5 is a side elevation of Fig. 4. Fig. 6 is a section on the line 6—6 of Fig. 4.

Referring specifically to the drawings, the system includes a hopper 1 which is supported in any suitable way, and into which the material to be conveyed is introduced. This hopper is provided at its discharge end with a valve 1ª controlling the flow of material to inlet T 2, one branch of which connects to the pipe 3 which may be made of connected sections supported by frames 40 whereby the pipe is supported in elevated position in order to take the material to the point desired. The outlets are indicated at 4, discharging into chutes 41 as shown.

Within the pipe is a flexible metal spiral or screw 5, which will bend to accommodate itself around bends in the pipe and which extends throughout the whole length of the pipe. This spiral may be made of spring steel. The hopper may be closed by a trap 6 which will make it air tight.

The intake T 2 is provided at its lower end with a rotary plate 9 which is attached to a hollow stud shaft 7 which extends outside the T and is provided with a gear 8 which may be driven by suitable gearing from any engine or motor "M," so as to rotate the plate and the spiral 5 one end of which is fastened thereto by rivets 10. The air pipe 11 enters the T through the shaft 7, and projects a short distance into the T at the axis of the spiral, as shown in Fig. 3, and compressed air or steam may be furnished through the pipe 11 from any suitable source.

At the other end 19 of the pipe a plate 20 is provided which is fastened to the end of the spiral 5 and provided with a shaft 21 on which is mounted a gear 21ª which may also be driven by a suitable motor if desired. This will be desirable on long pipe systems, but may be dispensed with on short systems, the purpose being to rotate a spiral in the pipe and thereby assist in advancing the material.

One or more outlets 4 may be located along the pipe line, the outlets being indicated at "O" and being each provided with a valve structure. This valve structure consists of a sleeve 14 which encircles the pipe and which may be turned thereon by means of a lever 13. The sleeve has an opening at "P" which may be registered with the opening "O," and also carries a valve member consisting of a segmental plate 12 having flanges 12ª which project into recesses "Q" in the sleeve and which are provided with pins 15 which will slide in inclined slots 16 in the sleeve. The lever 13 has a latch 13ª which may be engaged in notches 13ᵇ and 13ᶜ in the wall of the pipe, in either the open or closed position of the outlet valve.

In operation of the outlet valve, the lever is swung to turn the sleeve 14, and register the openings "O" and "P," as shown in Fig. 6. This action causes the pins 15 to ride down the slots 16 and first withdraw the plate 12 from the seat 17 and then the plate is picked up when the pins reach the ends of the slots and turned to open position, as shown in Fig. 6. To close the valve the lever is moved in the reverse direction and the sleeve turns on the pipe carrying with it the plate 12 until the plate 12 stops against the shoulder 17ª which extends half way around the opening O, and continued movement of the sleeve then causes the pins 15 to ride up the slots 16 and press the plate 12 inwardly against the seat 17 thereby effectually sealing the opening "O" and the inside of the plate 12 is then flush with the inside surface of the pipe.

In general operation, the material to be conveyed is placed in the hopper and allowed to flow into the inlet T 2, and in consequence of the action of the flexible spiral and the air blast the material is lifted or carried along through the pipe to the desired outlet from which it is discharged in the manner above indicated.

As stated, the flexible spring spiral accommodates itself to bends or angles of large radius in the pipe, and so the material can be lifted and conveyed to practically any point desired.

I claim:

1. A conveyer comprising a pipe having an inlet and an outlet, a flexible spiral rotatable therein, means to rotate the spiral, and means to inject a fluid under pressure into the inlet end of the pipe at the axis of the spiral.

2. A conveyer comprising a pipe, a flexible flat metal spiral extending lengthwise in the pipe and rotatable therein, means to rotate the spiral, and means to inject fluid under pressure into the inlet of the pipe at the axis of the spiral.

In testimony whereof, I affix my signature in presence of two witnesses.

FRANK JAMES.

Witnesses:
JOHN A. BOMMHARDT,
HARRY A. THOMPSON.